(12) United States Patent
Utsuno et al.

(10) Patent No.: US 8,248,824 B2
(45) Date of Patent: Aug. 21, 2012

(54) DC POWER SOURCE APPARATUS

(75) Inventors: Mizuki Utsuno, Niiza (JP); Masayuki Watanabe, Niiza (JP); Hideto Sugiura, Niiza (JP); Eri Tamegai, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 213 days.

(21) Appl. No.: 12/476,735

(22) Filed: Jun. 2, 2009

(65) Prior Publication Data

US 2009/0316439 A1    Dec. 24, 2009

(30) Foreign Application Priority Data

Jun. 19, 2008  (JP) .................. 2008-160247

(51) Int. Cl.
*H02M 3/22* (2006.01)

(52) U.S. Cl. ........................................ 363/16

(58) Field of Classification Search ............ 363/16, 363/21.01, 39, 40; 323/247, 250, 251; 336/200, 336/222, 223, 22, 170, 173, 180–184, 214–215
See application file for complete search history.

(56) References Cited

U.S. PATENT DOCUMENTS

| | | | |
|---|---|---|---|
| 5,521,573 A * | 5/1996 | Inoh et al. | 336/180 |
| 6,222,742 B1 * | 4/2001 | Schlecht | 363/16 |
| 6,807,069 B2 * | 10/2004 | Nieminen et al. | 363/17 |
| 6,956,749 B2 * | 10/2005 | Yasumura | 363/19 |
| 7,116,203 B2 * | 10/2006 | Nishikawa et al. | 336/208 |
| 7,145,784 B2 * | 12/2006 | Utsuno et al. | 363/16 |

FOREIGN PATENT DOCUMENTS

JP  2006-67751  3/2006

* cited by examiner

*Primary Examiner* — Adolf Berhane
*Assistant Examiner* — Yemane Mehari
(74) *Attorney, Agent, or Firm* — Oblon, Spivak, McClelland, Maier & Neustadt, L.L.P.

(57) ABSTRACT

A DC power source apparatus converts a DC input voltage into high-frequency power by turning on/off a switching element connected to a primary winding of a transformer and converts the high-frequency power transmitted to a secondary winding of the transformer into a DC output voltage. The primary and secondary windings of the transformer include a core winding set having a primary winding P1 wound around a leg of a core defining a closed magnetic path and a secondary winding externally wound around the primary winding and another core winding set having a primary winding P2 wound around a leg of the core and a secondary winding externally wound around the primary winding. The primary winding of each of the two core winding sets has a plurality of winding layers among which a lowermost one that is closest to the core is connected to the switching element.

4 Claims, 7 Drawing Sheets

DC POWER SOURCE APPARATUS

BACKGROUND OF THE INVENTION

1. Field of the Invention

The present invention relates to a DC power source apparatus, and particularly, to a power converting transformer used for a DC power source apparatus.

2. Description of the Related Art

Figure 1:
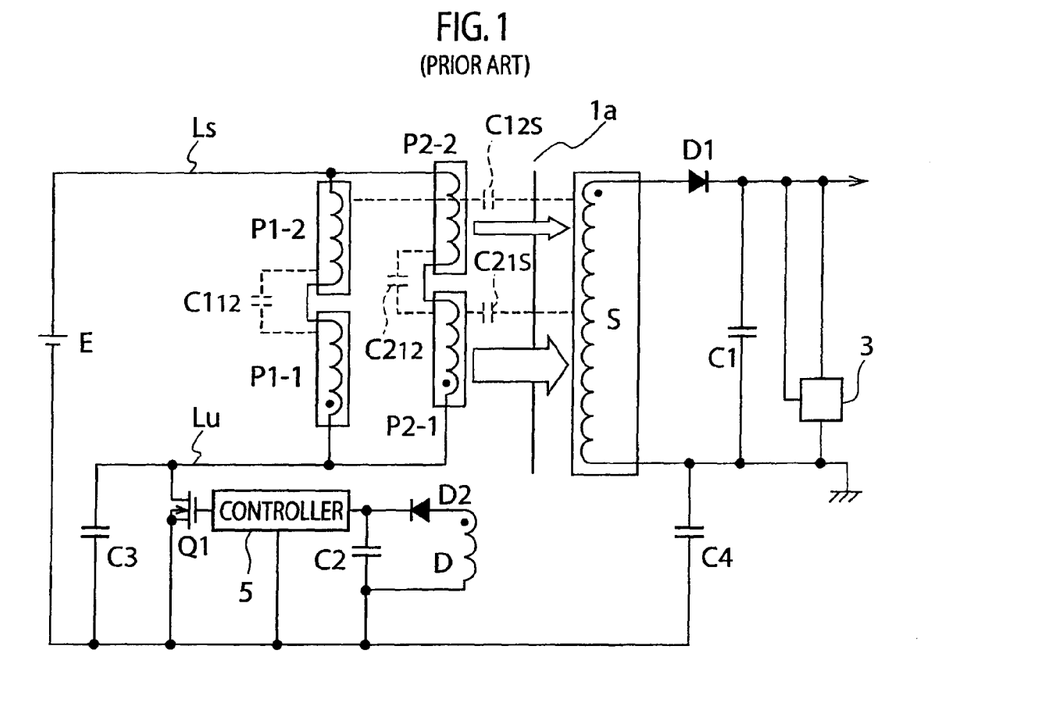
FIG. 1 is a circuit diagram illustrating a DC power source apparatus according to a related art.

FIG. 1 is a circuit diagram illustrating a DC power source apparatus according to a related art. The apparatus includes a switching element Q1 made of, for example, a MOSFET that is turned on/off to intermittently convert a DC input voltage from a DC power source E into high-frequency power, a transformer 1a having primary windings P1 and P2 between the switching element Q1 and a positive electrode of the DC power source E, to transmit the high-frequency power from the primary side to the secondary side, a rectifying-smoothing circuit consisting of a diode D1 and a smoothing capacitor C1, to convert the high-frequency power transmitted to the secondary side into a DC output voltage and supply the DC output voltage to a load, an output voltage detector 3 to detect the DC output voltage, compare the detected voltage with a reference voltage, and output an error signal, and a controller 5 to control an ON/OFF period of the switching element Q1 according to the error signal. The apparatus controls ON/OFF of the switching element Q1 so as to supply a predetermined output voltage to the load.

A voltage induced by a tertiary winding D is rectified and smoothed with a diode D2 and a capacitor C2 and is supplied as a source voltage to the controller 5.

Figure 2:
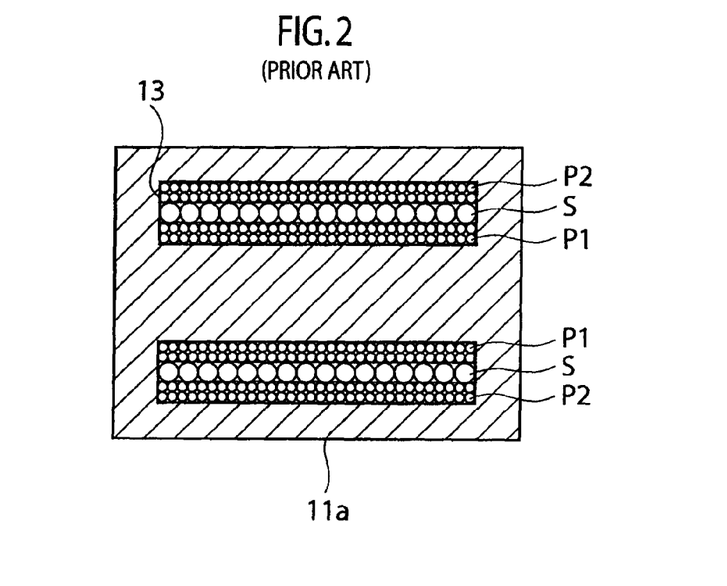
FIG. 2 is a sectional view illustrating a transformer arranged in the DC power source apparatus of FIG. 1.
Figure 3:
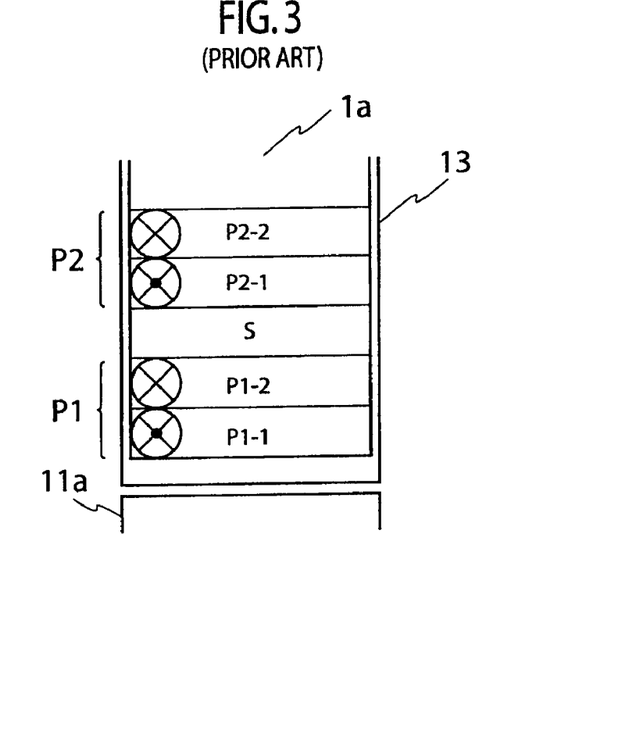
FIG. 3 is a schematic view illustrating windings of the transformer of FIG. 2.
Figure 4:
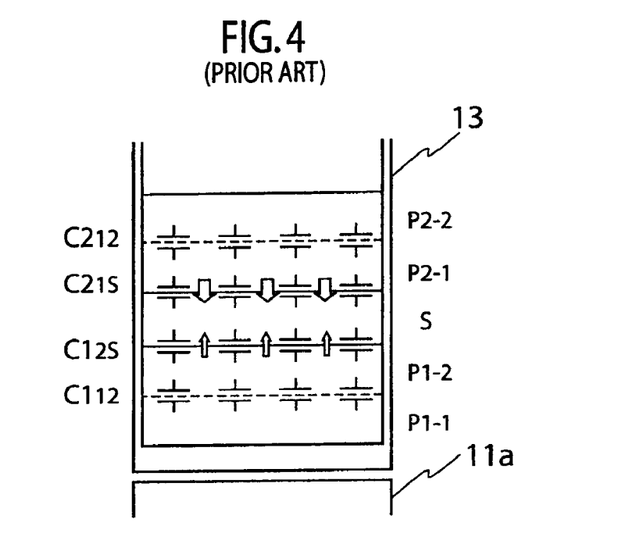
FIG. 4 is a view illustrating parasitic capacitances among the windings of FIG. 3.

FIG. 2 is a sectional view illustrating a structure of the transformer 1a of the DC power source apparatus of FIG. 1, FIG. 3 is a schematic view illustrating the windings of the transformer 1a, and FIG. 4 is a view illustrating parasitic capacitances among the windings of the transformer 1a.

In FIGS. 1 and 2, the transformer 1a has a core 11a made of magnetic material and a bobbin 13 fitted to the core 11a. The bobbin 13 is wound with, sequentially from an inner side, the first primary winding P1, a secondary winding S, the second primary winding P2, and the tertiary winding D (not illustrated). The core 11a defines two magnetic paths with a center leg being common to them. The first primary winding P1 has two winding layers P1-1 and P1-2 and the second primary winding P2 has two winding layers P2-1 and P2-2.

A sequence of winding the windings on the bobbin 13 will be explained. Downwardly from a left end of the bobbin 13, an element wire starts to be wound to form the winding layer P1-1. At a right end of the bobbin 13, the wire is turned back to form the winding layer P1-2 over the winding layer P1-1, thereby forming the first primary winding P1. On the winding layer P1-2, the secondary winding S is wound. Thereafter, the winding layers P2-1 and P2-2 are wound in the same direction as the winding layers P1-1 and P1-2, to form the second primary winding P2.

To improve productivity, the windings of the transformer 1a are generally wound in the same direction. As illustrated in FIG. 1, the first and second primary windings P1 and P2 are connected in parallel with each other. As illustrated in FIGS. 2 and 3, the secondary winding S is interposed between the first and second primary windings P1 and P2, to improve the degree of magnetic coupling between the primary windings P1 and P2 and the secondary winding S. As illustrated in FIG. 4, a parasitic capacitance C112 is present between the winding layers P1-1 and P1-2, a parasitic capacitance C12S between the winding layer P1-2 and the secondary winding S, a parasitic capacitance C21S between the secondary winding S and the winding layer P2-1, and a parasitic capacitance C212 between the winding layers P2-1 and P2-2.

In FIGS. 1 and 3, the winding layer P1-1 of the first primary winding P1 and the winding layer P2-1 of the second primary winding P2 adjacent to the secondary winding S are connected to the switching element Q1.

The switching element Q1 is always turned on and off, and at each time of the on/off operation, greatly changes potential. This potential change is applied to the first and second primary windings P1 and P2, to pass high-frequency currents to the secondary side through the parasitic capacitance C12S between the winding layer P1-2 of the first primary winding P1 and the secondary winding S and the parasitic capacitance C21S between the winding layer P2-1 of the second primary winding P2 and the secondary winding S.

The high-frequency currents due to the potential change created by the switching element Q1 circulate through a path extending along the primary windings P1 and P2, the secondary winding S, the secondary-side circuit, the ground, parasitic capacitance between the primary-side circuit and the ground, the primary-side circuit, and the primary windings P1 and P2. The high-frequency currents passed to the ground cause common-mode noise. The common-mode noise leaks to the DC power source E and radiates into the air, to badly affect other devices.

Considering a stable potential line Ls as a reference, the DC input voltage from the DC power source E is applied to a minus side of the primary windings P1 and P2 of the transformer 1a when the switching element Q1 turns on, and when the switching element Q1 turns off, a flyback voltage occurs to a plus side of the primary windings P1 and P2. Namely, a terminal of the primary windings P1 and P2 of the transformer 1a connected to the switching element Q1 is subjected to a largest potential change and the other terminal thereof connected to the stable potential line Ls is subjected to no potential change.

The parasitic capacitances between the primary windings P1 and P2 and the secondary winding S become larger as the windings become closer to one another. Accordingly, high-frequency currents passing through the parasitic capacitances among the primary windings P1 and P2 and the secondary winding S become larger if the terminal of the primary windings P1 and P2 connected to the switching element Q1 is positioned closer to the secondary winding S.

According to the related art illustrated in FIGS. 1 to 4, winding starts (indicated with black dots) of the primary windings P1 and P2 are connected to the switching element Q1. The winding layer P1-1 involving the winding start of the primary winding P1 is away from the secondary winding S. The winding layer P2-1 involving the winding start of the primary winding P2 is adjacent to the secondary winding S. Accordingly, a high-frequency current passing from the winding start of the primary winding P2 through the parasitic capacitance C21S to the secondary winding S is large. In FIG. 1, white arrows indicate high-frequency currents, the thicker the arrow the larger the current.

SUMMARY OF THE INVENTION

Figure 5:
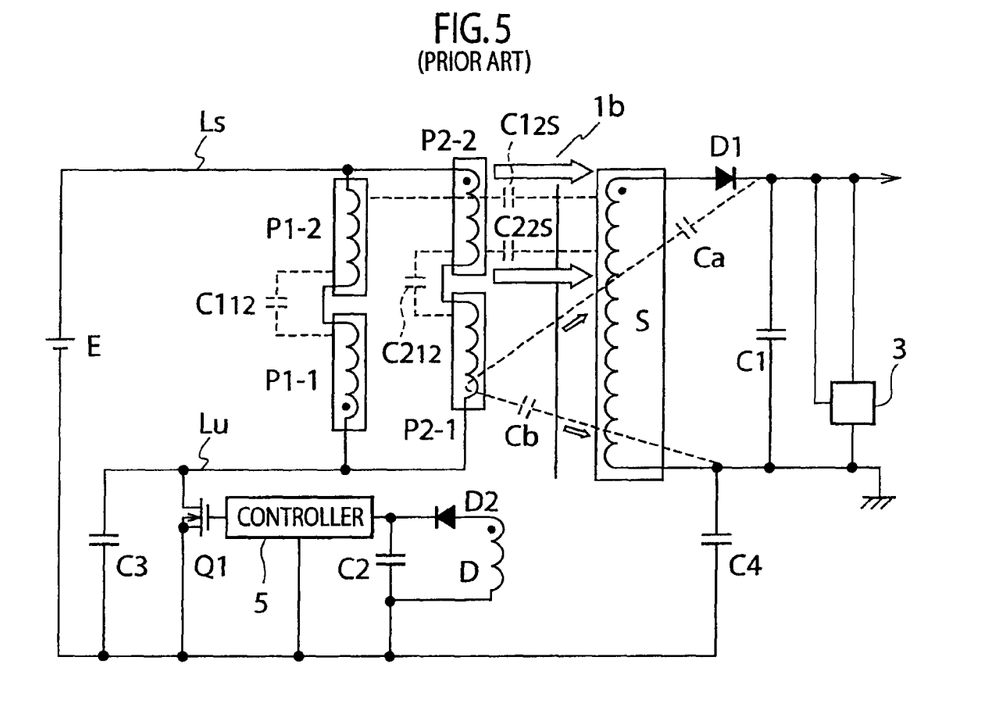
FIG. 5 is a circuit diagram illustrating a DC converter according to a related art.
Figure 6:
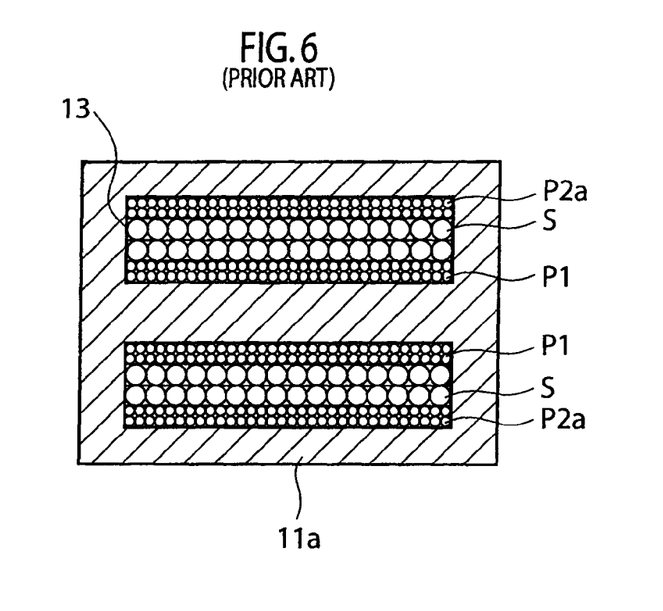
FIG. 6 is a sectional view illustrating a transformer arranged in the DC converter of FIG. 5.
Figure 7:
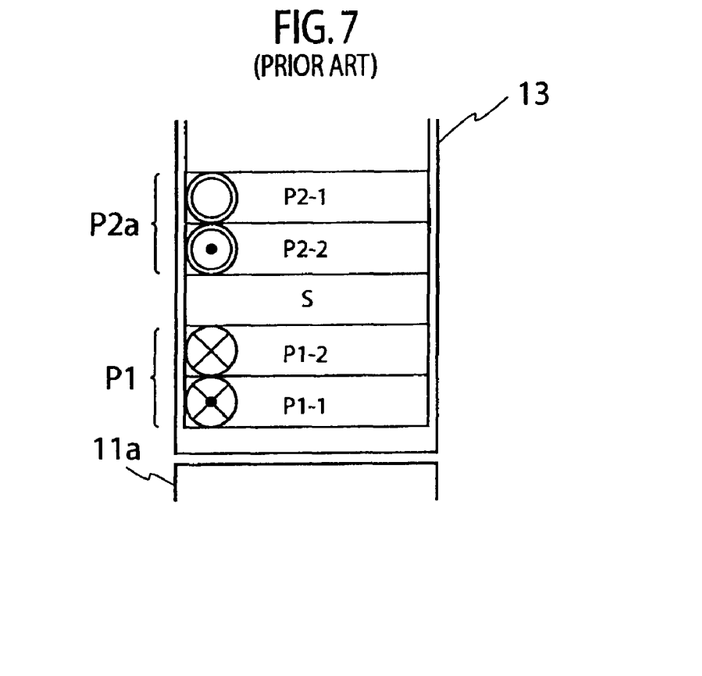
FIG. 7 is a schematic view illustrating windings of the transformer of FIG. 6.
Figure 8:
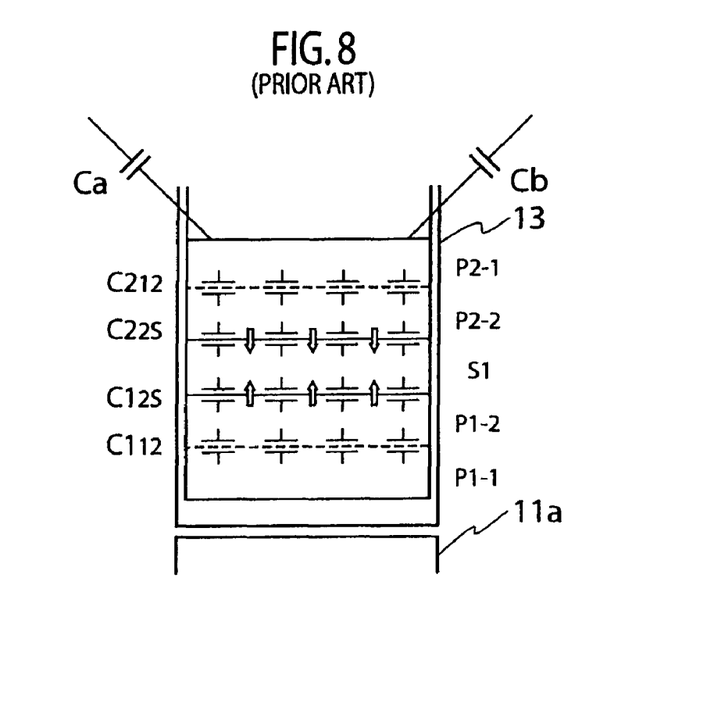
FIG. 8 is a view illustrating parasitic capacitances among the windings of FIG. 7.

To reduce the common-mode noise due to high-frequency currents, there is a related art illustrated in FIGS. 5 to 8 in which FIG. 5 is a circuit diagram illustrating a DC converter according to the related art, FIG. 6 is a sectional view illustrating a transformer arranged in the DC converter of FIG. 5, FIG. 7 is a schematic view illustrating windings of the transformer of FIG. 6, and FIG. 8 is a view illustrating parasitic capacitances among the windings of FIG. 7. This related art employs a specific winding technique for a primary winding P2.

In FIGS. 5 and 6, the transformer 1b has a core 11a made of magnetic material and a bobbin 13 fitted to the core 11a. The bobbin 13 is wound with, sequentially from an inner side, a first primary winding P1, a secondary winding S, a second primary winding P2, and a tertiary winding D (not illustrated). The first primary winding P1 has two winding layers P1-1 and P1-2. The second primary winding P2 has two winding layers P2-1 and P2-2.

A sequence of winding the windings on the bobbin 13 will be explained. Downwardly from a left end of the bobbin 13, an element wire starts to be wound to form the winding layer P1-1. At a right end of the bobbin 13, the wire is turned back to form the winding layer P1-2 over the winding layer P1-1, thereby forming the first primary winding P1. On the winding layer P1-2, the secondary winding S is wound.

Thereafter, an element wire starts to be wound around the secondary winding S, to form the winding layer P2-2. The wire is turned back at the right end of the bobbin 13, to form the winding layer P2-1 over the winding layer 2-2, thereby forming the second primary winding P2. The winding layers P2-1 and P2-2 are wound in an opposite direction to the winding layers P1-1 and P1-2.

As illustrated in FIG. 8, a parasitic capacitance C112 is present between the winding layers P1-1 and P1-2, a parasitic capacitance C12S between the winding layer P1-2 and the secondary windings, a parasitic capacitance C22S between the secondary winding S and the winding layer P2-2, and a parasitic capacitance C212 between the winding layers P2-1 and P2-2.

In FIGS. 5 and 7, a winding start (indicated with a black dot) of the winding layer P1-1 and a winding end of the winding layer P2-1 are connected to a switching element Q1. A winding end of the winding layer P1-2 and a winding start (indicated with a black dot) of the winding layer P2-2 are connected to a stable potential Ls on the positive electrode side of a DC power source E.

The first and second primary windings P1 and P2 are oppositely wound, and therefore, generate magnetic flux of the same phase when a current passes therethrough. This means that the first and second primary windings P1 and P2 are connected in parallel with each other.

In this way, this related art arranges the winding layers P1-1 and P2-1 that are connected to the switching element Q1 and involve large voltage changes at positions farthest from the secondary winding S to cause small parasitic capacitances with respect to the secondary winding S. Also, the related art arranges the winding layers P2-2 and P1-2 that are connected to the stable potential line Ls and involve little voltage changes at positions closest to the secondary winding S to cause large parasitic capacitances. This arrangement reduces high-frequency currents passing from the first and second primary windings P1 and P2 to the secondary winding S. The DC converter of this related art has a simple structure, reduces common-mode noise, and minimizes leakage inductance because both the first and second primary windings P1 and P2 are in contact with the secondary winding S.

A transformer according to still another related art is disclosed in Japanese Unexamined Patent Application Publication No. 2006-067751.

The transformer illustrated in FIGS. 5 and 7 or the transformer described in the above-mentioned document arranges the winding layers P1-1 and P2-1 involving large voltage changes at positions farthest from the secondary winding S so as to reduce parasitic capacitances with respect to the secondary winding S. According to this arrangement, the outermost winding layer is connected to an unstable line Lu on the switching element side, and therefore, this part radiates large noise through parasitic capacitances Ca and Cb, to cause large problems on peripheral electronic devices.

The present invention provides a DC power source apparatus having a transformer that has a simple structure to minimize noise radiation without increasing leakage inductance.

According to an aspect of the present invention, there is provided a DC power source apparatus for converting a DC input voltage from a DC power source into high-frequency power by turning on/off a switching element connected to a primary winding of a transformer, converting the high-frequency power transmitted to a secondary winding of the transformer into a DC output voltage through a rectifying-smoothing circuit, and controlling an ON/OFF period of the switching element according to the DC output voltage through a controller so as to supply a predetermined output voltage to a load. The primary and secondary windings of the transformer have a plurality of core winding sets each having a primary winding wound around a core defining a closed magnetic path and a secondary winding externally wound around the primary winding. The primary winding of each of the core winding sets comprises a plurality of winding layers among which a lowermost one that is closest to the core is connected to the switching element.

DESCRIPTION OF THE PREFERRED EMBODIMENT

A DC power source apparatus according to an embodiment of the present invention will be explained in detail with reference to the drawings.

Figure 9:
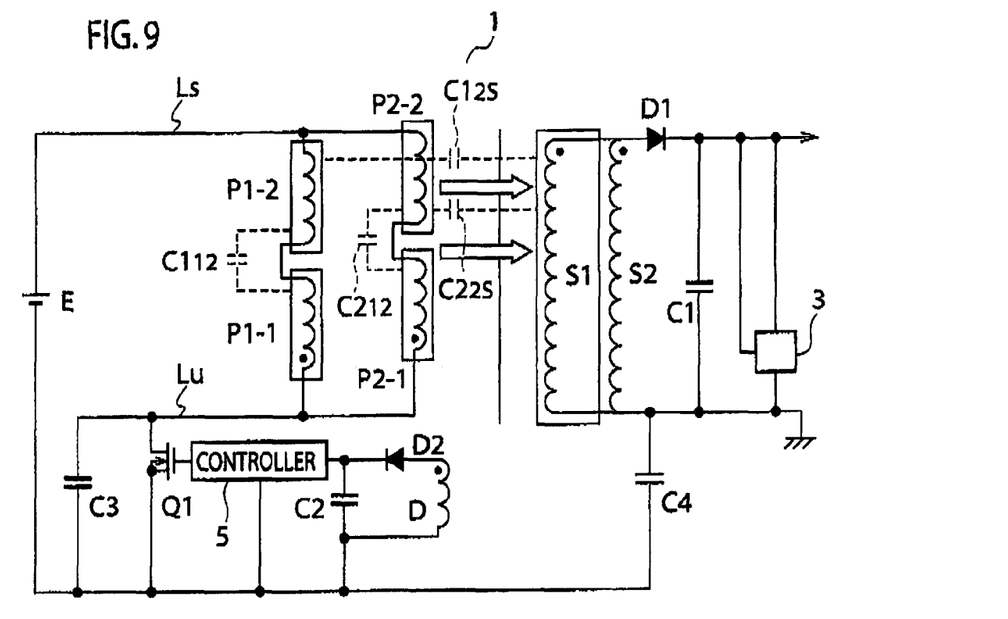
FIG. 9 is a circuit diagram illustrating a DC power source apparatus according to the present invention.
Figure 10:
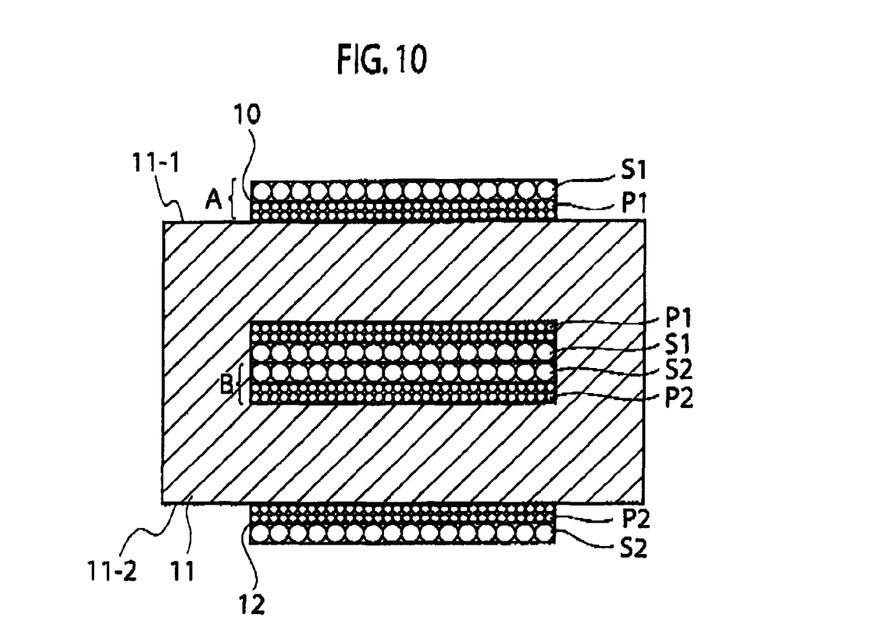
FIG. 10 is a sectional view illustrating a transformer arranged in the DC power source apparatus of FIG. 9.
Figure 11A:
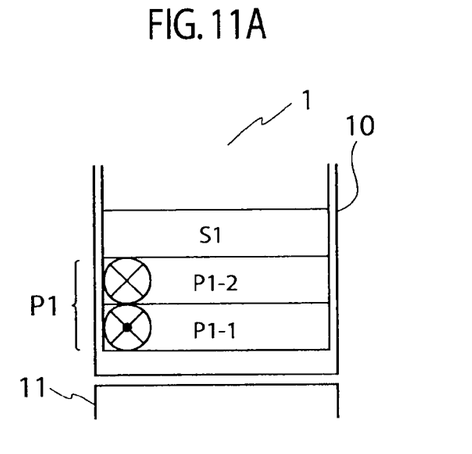
FIG. 11A is a schematic view illustrating windings at a part A of FIG. 10.
Figure 11B:
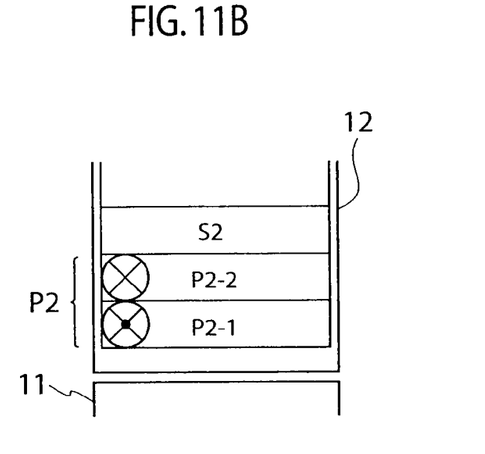
FIG. 11B is a schematic view illustrating windings at a part B of FIG. 10.
Figure 12A:
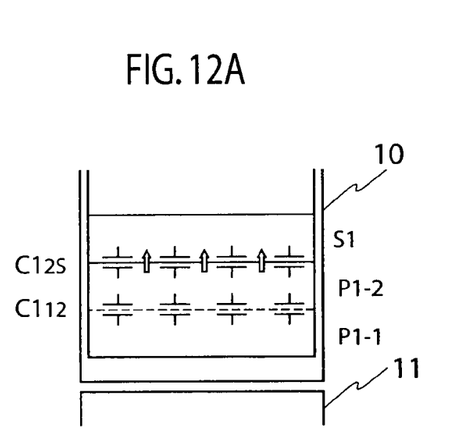
FIG. 12A is a view illustrating parasitic capacitances among the windings of FIG. 11A.
Figure 12B:
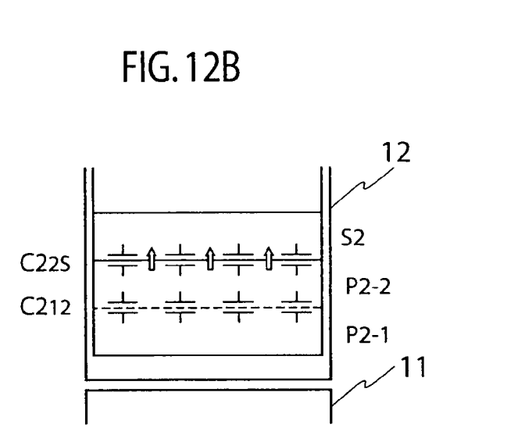
FIG. 12B is a view illustrating parasitic capacitances among the windings of FIG. 11B.
Figure 13:
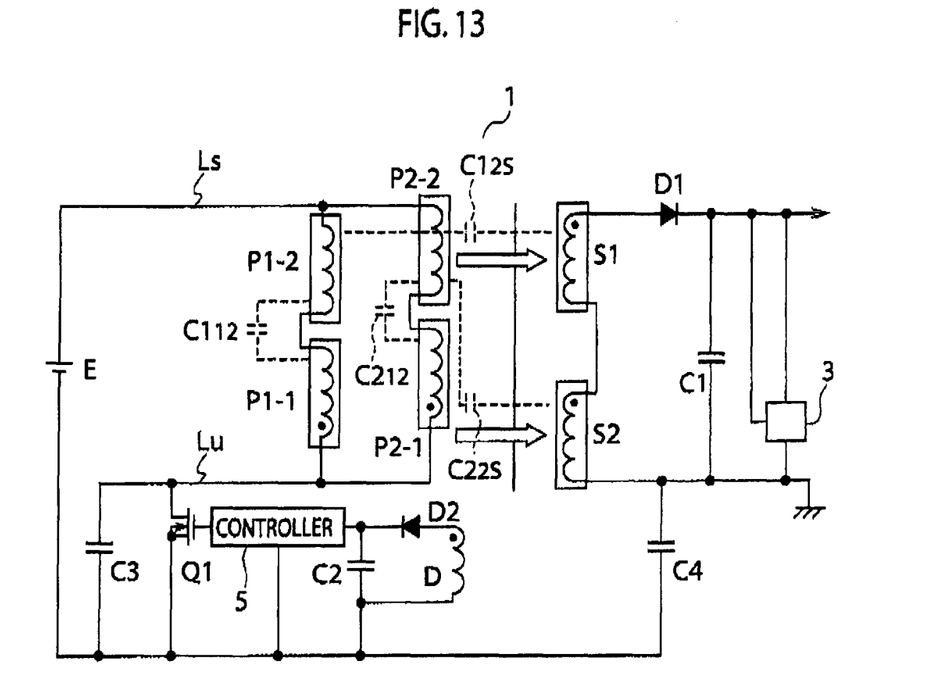
FIG. 13 is a circuit diagram illustrating an alternative embodiment of the DC power source apparatus of FIG. 9 in which the two secondary windings (S1-S2) are connected in series.

FIG. 9 is a circuit diagram illustrating a DC power source apparatus according to an embodiment of the present invention, FIG. 10 is a sectional view illustrating a transformer arranged in the DC power source apparatus of FIG. 9, FIG. 11A is a schematic view illustrating windings of a part A of FIG. 10, FIG. 11B is a schematic view illustrating windings of a part B of FIG. 10, FIG. 12A is a view illustrating parasitic capacitances among the windings of FIG. 11A, and FIG. 12B is a view illustrating parasitic capacitances among the windings of FIG. 11B.

In FIG. 9, parts corresponding to those illustrated in FIG. 5 are represented with like reference marks. In FIGS. 9 and 10, the transformer 1 has a core (iron core) 11 that is a combination of U-shaped cores and has a center gap, a bobbin 10 into which a leg 11-1 of the core 11 is inserted, and a bobbin 12 into which a leg 11-2 of the core 11 is inserted. The core 11 defines a closed magnetic path.

The bobbin 10 is wound with, sequentially from an inner side, a first primary winding P1 and a first secondary winding S1 to form a core winding set. The first primary winding P1 consists of winding layers P1-1 and P1-2 connected in series.

The bobbin 12 is wound with, sequentially from an inner side, a second primary winding P2 and a second secondary winding S2 to form another core winding set. The second primary winding P2 consists of winding layers P2-1 and P2-2 connected in series.

The primary winding is divided into the first and second primary windings P1 and P2 that are connected in parallel with each other. The secondary winding is divided into the first and second secondary windings S1 and S2 that are connected in parallel with each other.

Among the two winding layers P1-1 and P1-2 of the first primary winding P1, the winding layer P1-1 is connected to a switching element Q1 and is a lowermost layer that is closest to the core 11. Among the two winding layers P2-1 and P2-2 of the second primary winding P2, the winding layer P2-1 is connected to the switching element Q1 and is a lowermost layer that is closest to the core 11.

An end of the lowermost winding layer P1-1 is connected to the switching element Q1 and the other end thereof is connected through the upper winding layer P1-2 to a stable potential line Ls. In a similar manner, an end of the lowermost winding layer P2-1 is connected to the switching element Q1 and the other end thereof is connected through the upper winding layer P2-2 to the stable potential line Ls.

A sequence of winding the windings on the bobbin 10 will be explained with reference to FIGS. 10 and 11A. Downwardly from a left end of the bobbin 10, an element wire starts to be wound to form the winding layer P1-1. At a right end of the bobbin 10, the wire is turned back to form the winding layer P1-2 over the winding layer P1-1, thereby forming the first primary winding P1. Thereafter, the first secondary winding S1 is wound over the winding layer P1-2.

As illustrated in FIG. 12A, a parasitic capacitance C112 exists between the winding layers P1-1 and P1-2 and a parasitic capacitance C12S between the winding layer P1-2 and the first secondary winding S1.

A sequence of winding the windings on the bobbin 12 will be explained with reference to FIGS. 10 and 11B. Downwardly from a left end of the bobbin 12, an element wire starts to be wound to form the winding layer P2-1. At a right end of the bobbin 12, the wire is turned back to form the winding layer P2-2 over the winding layer P2-1, thereby forming the second primary winding P2. Thereafter, the second secondary winding S2 is wound over the winding layer P2-2.

As illustrated in FIG. 12B, a parasitic capacitance C212 exists between the winding layers P2-1 and P2-2 and a parasitic capacitance C22S exists between the winding layer P2-2 and the second secondary winding S2.

In the transformer 1 of the above-mentioned configuration, a winding start (indicated with a black dot) of the winding layer P1-1 and a winding start (indicated with a black dot) of the winding layer P2-1 are connected to the switching element Q1 as illustrated in FIGS. 9, 11A, and 11B. A winding end of the winding layer P1-2 and a winding end of the winding layer P2-2 are connected to the stable potential line Ls on the positive electrode side of a DC power source E.

In this way, the transformer 1 of FIG. 9 according to the embodiment arranges the winding layers P1-1 and P2-1 those are connected to the switching element Q1 and involve large voltage changes at positions farthest from the secondary windings S1 and S2, thereby parasitic capacitances existing with respect to the secondary winding S1 is reduced. At the same time, the winding layers P2-2 and P1-2 are connected to the stable potential line Ls and arranged at positions nearest to the secondary windings S1 and S2 where related parasitic capacitances are large. This arrangement reduces high-frequency currents passing from the first and second primary windings P1 and P2 to the secondary windings S1 and S2. In addition, the secondary windings S1 and S2 provide a shielding effect.

Arranging the winding layers P1-1 and P2-1 involving large voltage changes at lowermost layer positions on inner sides of the secondary windings S1 and S2 is simple in configuration and reduces noise radiation.

Due to the two core wiring sets, one having the primary winding P1 and secondary winding S1 and the other having the primary winding P2 and secondary winding S2, contact areas between the primary windings P1 and P2 and the secondary windings S1 and S2 are increased, leakage inductance is reduced, and the thickness of each winding layer is also reduced.

The present invention is not limited to the above-mentioned embodiment. According to the embodiment, the two secondary windings S1 and S2 are connected in parallel with each other. Instead, they may be connected in series. According to the embodiment, the number of core winding sets is two. Instead, it may be three or more. Each winding layer may be made of a plate-like conductor.

According to the present invention, each primary winding of each of a plurality of core winding sets comprises a plurality of winding layers. Among the plurality of winding layers of each primary winding, the one connected to a switching element is a lowermost layer that is closest to a core. This configuration is simple and reduces noise radiation without increasing leakage inductance. The plurality of core winding sets each including primary and secondary windings increase contact areas between the primary and secondary windings and reduce leakage inductance.

The present invention is applicable to power source apparatuses of DC-DC converters, AC-DC converters, and the like.

This application claims benefit of priority under 35USC §119 to Japanese Patent Application No. 2008-160247, filed on Jun. 19, 2008, the entire content of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A DC power source apparatus for converting a DC input voltage from a DC power source into high-frequency power by turning on/off a switching element connected to a primary winding of a transformer, converting the high-frequency power transmitted to a secondary winding of the transformer into a DC output voltage through a rectifying-smoothing circuit, and controlling an ON/OFF period of the switching element according to the DC output voltage through a controller so as to supply a predetermined output voltage to a load, the power source apparatus comprising:

a plurality of core winding sets forming the primary and secondary windings, each having a primary winding wound around a core defining a closed magnetic path and a secondary winding externally wound around the primary winding;

the primary winding of each of the core winding sets comprises a plurality of winding layers among which a lowermost one that is closest to the core is connected to the switching element; and the core is a combination of U-shaped cores which defines the closed magnetic path.

2. The DC power source apparatus of claim 1, wherein the primary windings of the core winding sets are connected in parallel with one another and the secondary windings of the core winding sets are connected in parallel with one another; and a rectifying-smoothing circuit converts the high-frequency power transmitted to the parallel connection of the secondary windings of the core winding sets into a DC output voltage.

3. The DC power source apparatus of claim 1, wherein the primary windings of the core winding sets are connected in parallel with one another and the secondary windings of the core winding sets are connected in series; and a rectifying-smoothing circuit converts the high-frequency power transmitted to the series connection of the secondary windings of the core winding sets into a DC output voltage.

4. A winding structure of a transformer for a DC power source apparatus that converts a DC input voltage from a DC power source into high-frequency power by turning on/off a switching element being connected to a primary winding of a transformer, converts the high-frequency power transmitted to a secondary winding of the transformer into a DC output voltage through a rectifying-smoothing circuit, and controls an ON/OFF period of the switching element according to the DC output voltage through a controller so as to supply a predetermined output voltage to a load, the winding structure comprising:

a plurality of core winding sets forming the primary and secondary windings, each having a primary winding wound around a core defining a closed magnetic path and a secondary winding externally wound around the primary winding, wherein the primary winding of each of the core winding sets comprises a plurality of winding layers among which a lowermost one that is closest to the core has an end connected to the switching element and the other end connected through other winding layers to a DC input voltage line, and the core is a combination of U-shaped cores which defines the closed magnetic path.

* * * * *